Feb. 10, 1959 C. VAN DER LELY ET AL 2,872,773
RESILIENT ROTARY RAKING WHEEL
Filed Nov. 5, 1956 3 Sheets-Sheet 1

INVENTORS
CORNELIS VAN DER LELY
ARY VAN DER LELY

INVENTORS
CORNELIS VAN DER LELY
ARY VAN DER LELY

INVENTORS
CORNELIS VAN DER LELY
ARY VAN DER LELY

United States Patent Office 2,872,773
Patented Feb. 10, 1959

2,872,773

RESILIENT ROTARY RAKING WHEEL

Cornelis van der Lely and Ary van der Lely, Maasland, Netherlands, assignors to C. van der Lely N. V.

Application November 5, 1956, Serial No. 620,384

Claims priority, application Netherlands November 29, 1955

14 Claims. (Cl. 56—377)

This invention relates to devices of the type provided with at least one wheel for laterally displacing material lying on a surface, said wheel being driven by contact with the surface or material present on said surface.

Such devices are generally used as rakes and are mostly provided with rake wheels constituted of metal and provided with resilient steel tines. Sometimes it is a disadvantage of this construction that the tines, when coming free from their contact with the ground, suddenly spring back to their position of equilibrium, which movement cannot be followed by the material being raked, owing to which this material is left on the ground.

According to the invention a part of the wheel is connected to the hub of a wheel by means of pliant material, such as rubber or plastic, reinforced if required. Owing to this, a flexible wheel has been obtained which if the device is used as a rake laterally displaces the material lying on the surface in a very useful way. However, the device according to the invention can also be used for other purposes such as, for example, for cleaning surfaces. Moreover, devices of the invention are especially suitable for cleaning lawns.

According to one embodiment of the invention, the wheel is a disc provided with said pliant material constituting the connection with the hub, owing to which a simple construction is obtained. In this construction, the whole wheel may consist of said material with, perhaps, the exception of the hub. It has appeared that it is favorable if the material is resilient in such a way that, when the device is used as a rake, the wheel is flattened upon coming into contact with the surface being processed and, consequently, is in contact with the ground over a large width, owing to which the working width is considerably enlarged.

A very useful device is obtained if the wheel at its circumference is provided with projections of said pliant material serving as tines. Such tines work very favorably when laterally displacing crop lying on the surface. Moreover, the construction of such a wheel is very simple. Further, it is favorable if apertures are provided in said material owing to which the wheel becomes still more flexible and can adapt itself better to the surface to be worked.

The invention will be hereinafter more fully explained with reference to the accompanying drawings in which some preferred embodiments have been shown by way of example and in which.

Figure 1:
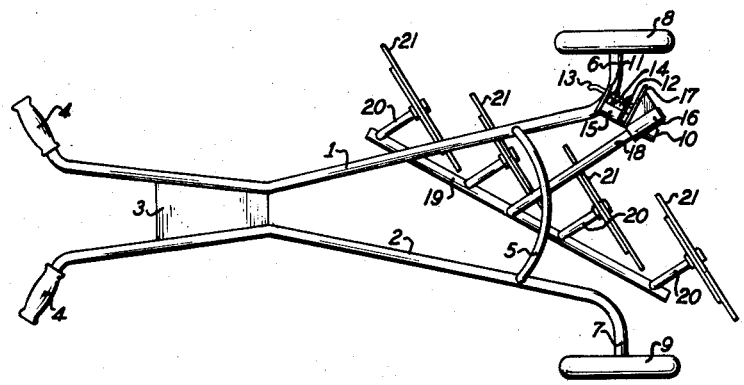
Fig. 1 is a plan view of a device according to the invention.

As shown in Fig. 1, a device in accordance with one embodiment of the invention comprises frame tubes 1 and 2 connected to one another by a plate 3 and a bow 5. The upper extremities of the tubes 1 and 2 each constitute a grip 4. The lower extremities of the tubes 1 and 2 constitute axles 6 and 7 for running wheels 8 and 9.

On the tube 1, an axle 10 is mounted to which limbs 11 and 12 are attached. Through apertures (not shown) in limbs 11 and 12, a locking pin 13 is inserted around which a spring 14 is mounted. A bearing 15 is rotatably mounted on the axle 10 and a bearing 16 is attached to the bearing 15.

A sector-shaped plate 17 is perpendicularly mounted on the bearing 15. The pin 13 is pressed against the sector-shaped plate 17 by the spring 14. In the sector-shaped plate 17, two apertures are provided in which the pin 13 can be inserted. When the pin 13 is inserted in one of the apertures in the plate 17, the rotation of the bearing 15 around the axle 10 is prevented. In the bearing 16, a beam 18 is rotatably mounted, and the free extremity of this beam is connected to a frame beam 19, which is provided with axles 20 on which rake wheels 21 are mounted for free rotation. The rake wheels 21 are in contact with the ground and are obliquely arranged with regard to the travelling direction owing to which the rake wheels will be rotated by contact with the ground and/or material thereon. By this rotation of the wheels, the material lying on the ground will be laterally displaced.

Figure 2:
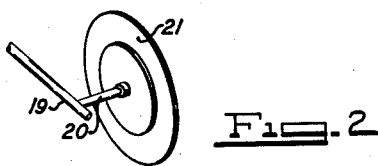
Fig. 2 illustrates an embodiment of the wheel position of the device according to Fig. 1.

As shown in Fig. 2, the axles 20 can be attached to the beam 19 in an inclined position. Owing to this, the wheel planes will make an angle with the surface which is smaller than 90°. This position can be very useful in certain circumstances such as for clearing a surface. The wheels 21 for the device can be constituted in different ways. Some different embodiments of these wheels will next be described.

Figure 3:
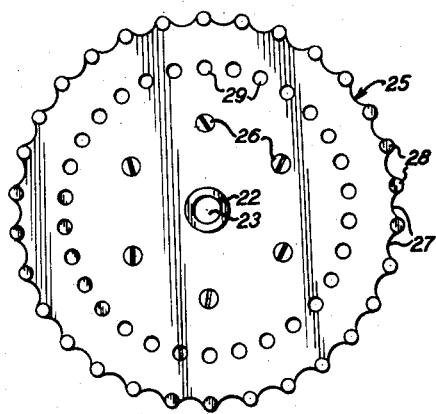
Fig. 3 is an enlarged front view of a modified wheel for the device according to Fig. 1.
Figure 4:
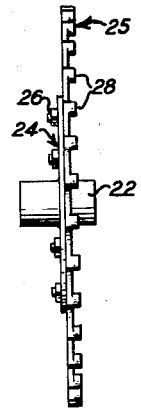
Fig. 4 is a side view of the wheel according to Fig. 3.

According to Figs. 3 and 4, a rake wheel is provided with a hub 22 in which an axle hole 23 is present. To the hub 22, a disc 24 is connected and, on this disc, a disc 25 is mounted by means of bolts 26. The disc 25 is constituted of rubber, a resilient plastic or a similar material. The disc 25 at its circumference is provided with scallopings 27, between which laterally extending raking elements such as the tines 28 are provided. In the disc and between the circumference of the wheel and the hub, a circle of holes 29 is arranged. The disc 25 is pliant so that the wheel may bend to present a lateral surface to the ground.

Figure 5:
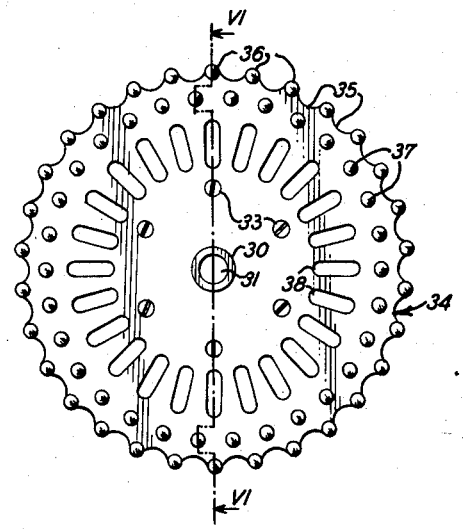
Fig. 5 is an enlarged front view of a modified wheel for the device according to Fig. 1.
Figure 6:
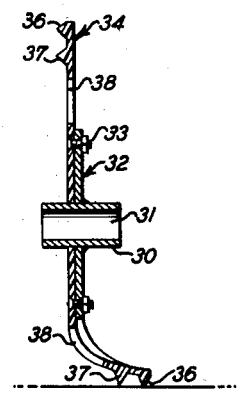
Fig. 6 is a sectional view according to line VI—VI of the wheel shown in Fig. 5.

According to Figs. 5 and 6, a wheel is provided with a hub 30 having an axle hole 31. To the hub 30, a disc 32 is attached which carries a pliant disc 34 by means of bolts 33. At the circumference of the disc 34, scallopings 35 are provided. Between these scallopings 35, conical tines 36 placed in a circle are provided. Further, a second circle of conical tines 37 is provided. The pliant disc 34 is provided with oblong holes 38.

The wheels provided with tines according to Figs. 3-6 are especially useful for laterally displacing crop lying on the ground. When coming into contact with the ground, the lowermost portion of the wheel is bent as shown in Fig. 6, owing to which the tines attached to the side of the wheels come into contact with the ground and the tines are directed in a radial direction. When using more circles of tines, the tines of a circle with a smaller diameter can remain free from the ground. The apertures 29 and 38 in the wheel enable an easier bending of the wheel.

Figure 7:
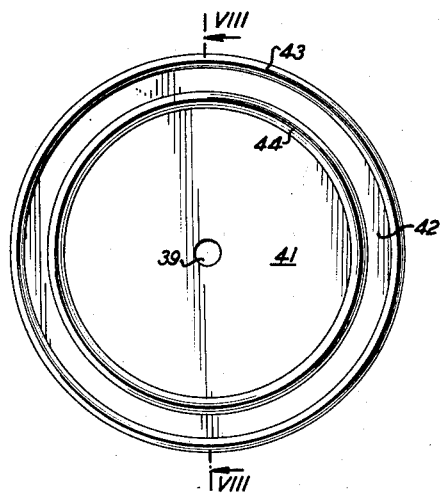
Fig. 7 is an enlarged front view of another wheel for the device according to Fig. 1.
Figure 8:
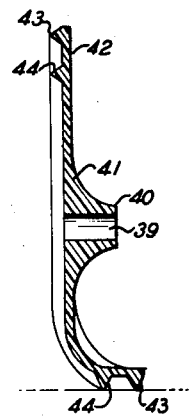
Fig. 8 is a sectional view according to line VIII—VIII of the wheel shown in Fig. 7.

In Figs. 7 and 8, the wheel is cast or pressed of one piece of material. A wheel constructed in this way can be manufactured very simply. The rake wheel is provided with a hub 40 having an axle hole 39. The hub 40 extends via the portion 41 into the thin periphery 42 to which a ledge 43 is attached. Further, a second ledge 44 is provided with a smaller diameter.

Figure 9:
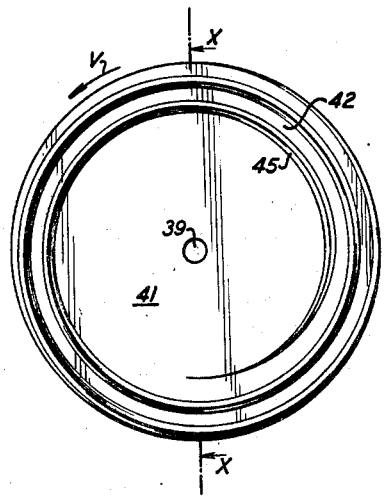
Fig. 9 is an enlarged front view of another wheel for the device according to Fig. 1.
Figure 10:
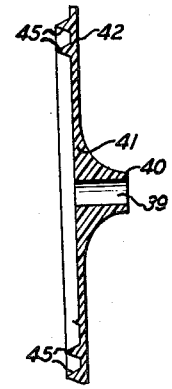
Fig. 10 is a sectional view according to line X—X of the wheel shown in Fig. 9.

The wheel according to Figs. 9 and 10 is constructed in the same way as the wheel according to Figs. 7 and 8; however, instead of two concentric ledges, one helical ledge 45 is provided. Parts corresponding with those of Figs. 7 and 8 have the same reference numerals.

Figure 11:
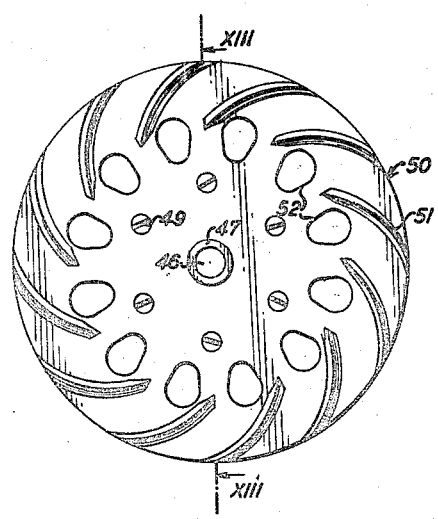
Fig. 11 is an enlarged front view of a modified wheel for the device according to Fig. 1.
Figure 13:
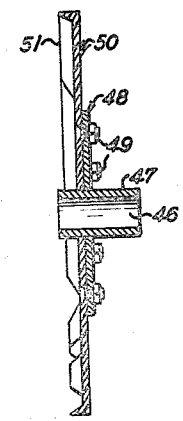
Fig. 13 is a section according to line XIII—XIII of the wheel shown in Fig. 11.
Figure 12:
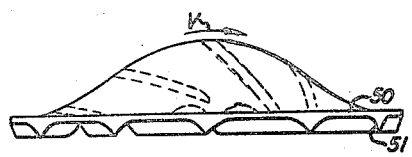
Fig. 12 is a front view of the wheel according to Fig. 11, in which the wheel is flattened by contact with the ground.

The wheel according to Figs. 11–13 is provided with a hub 47 comprising an axle hole 46. To the hub 47, a disc 48 is attached, carrying a pliant disc 50 by means of bolts 49. To the periphery of the disc 50, short blade-shaped ledges 51 are attached; within the circle of these blade-shaped ledges, apertures 52 are provided.

The wheels according to Figs. 7–13 are more suitable for laterally displacing material other than crop and can be used, for example, for cleaning streets. The helical ledge 45 in Fig. 9 has the advantage over the concentric ledges in Fig. 7 that the material extends to the center of the wheel, owing to which the material is elevated and can be, more easily, laterally delivered.

The wheels with the blade-shaped ledges according to Fig. 9 get their rotation due to the fact that the ledges, when in contact with the ground, begin to move according to their length-direction; in this way, the wheel begins to move at the bottom according to the arrow V.

What we claim is:

1. A raking element of the wheel type comprising a freely rotatable disc at least in part of pliant material and raking elements on and extending laterally of the disc whereby the disc can be flexed to present a lateral surface thereof to the ground so that the raking elements can engage material lying on the ground and the disc thereby rotated.
2. An element as claimed in claim 1 wherein the entire disc is of pliant material.
3. An element as claimed in claim 1 wherein the raking elements are of pliant material.
4. An element as claimed in claim 1 wherein the raking elements are conical.
5. An element as claimed in claim 1 wherein the disc includes a scalloped periphery.
6. An element as claimed in claim 1 wherein the disc includes a scalloped periphery and the raking elements are mounted between the scallops.
7. An element as claimed in claim 1 wherein the raking elements are arranged in two concentric circles.
8. An element as claimed in claim 1 wherein the raking elements are constituted by a ledge.
9. An element as claimed in claim 1 wherein the raking elements are constituted by a helical ledge.
10. An element as claimed in claim 1 wherein the raking elements and disc are integral.
11. An element as claimed in claim 1 wherein the disc thickens from its periphery to its center.
12. An element as claimed in claim 1 wherein the disc defines apertures increasing the flexibility of the disc.
13. An element as claimed in claim 1 wherein the disc is of rubber.
14. An element as claimed in claim 1 wherein the disc is of plastic.

References Cited in the file of this patent

UNITED STATES PATENTS

| | | |
|---|---|---|
| 1,779,682 | Stratford | Oct. 28, 1930 |
| 2,206,612 | Linaberry | July 2, 1940 |
| 2,286,095 | Innes | June 9, 1942 |
| 2,447,354 | Morrill | Aug. 17, 1948 |
| 2,532,652 | Wray | Dec. 5, 1950 |
| 2,689,446 | Sorrels | Sept. 21, 1954 |